Patented June 16, 1942

2,286,327

UNITED STATES PATENT OFFICE 2,286,327

BARIUM SALT OF THE PSEUDO ACID OF NITROAMINOGUANIDINE AND METHOD OF PREPARING THE SAME

Kenneth D. Ashley, Darien, Conn., assignor to American Cyanamid Company, New York, N. Y., a corporation of Maine No Drawing. Application November 9, 1940, Serial No. 365,007

3 Claims. (Cl. 260—564)

The present invention relates to the barium salt of the pseudo acid of nitroaminoguanidine and to a method of preparing the same according to the following reaction:

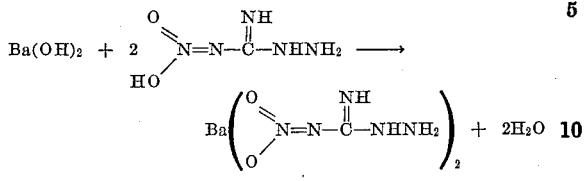

Nitroaminoguanidine was prepared by dissolving 165 g. of hydrazine sulfate in 3500 cc. of ammonium hydroxide solution (1 N). 135 g. of nitroguanidine was added to the solution over a period of approximately 15 minutes with mild agitation. The mixture was stirred at 40° C. for one hour and then at 65° C. for one hour. The solution was vacuum concentrated to 600 cc.

The concentrated solution was then cooled to 15° C. whereupon crystals of nitroaminoguanidine were precipitated. This product was recrystallized as follows: 122 g. of washed and dried crystals of crude nitroaminoguandine prepared as above were dissolved in 1000 cc. of water at 95° C. and 2 g. of Darco added. After agitation, the liquid was filtered and the filtrate cooled to 10° C., and the resultant nitroaminoguanidine recovered. The dried product was white and had a melting point of 182° C. Upon recrystallization from water, the melting point was 187° C.

9 g. of the above crystals of nitroaminoguanidine was further purified by dissolving the same in 300 cc. of water and 45 cc. of concentrated hydrochloric acid. The solution was neutralized to pH$_6$ with 20% sodium carbonate. A white product was thus obtained having a melting point of 187.5° C.

Example 6 g. of nitroaminoguanidine prepared as above and recrystallized from hydrochloric acid solution was dissolved in 120 cc. of hot water and to this hot solution was added a slurry of 8 g. Ba(OH)$_2$.H$_2$O in hot water. The materials nearly all dissolved and on standing, white crystals separated. They were washed with alcohol and dried. This salt corresponds to the formula:

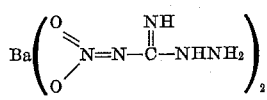

The salt has explosive properties. For instance, nitroaminoguanidine, when touched with a red hot iron, flares only where it is touched, while the whole of a long thin train of the barium salt is exploded by touching it at one end with a wire heated to dull redness. There is evidence of detonation when the salt is struck with a hammer on an anvil.

While the invention has been described with specific reference to specific embodiments, it is to be understood that it is not to be limited thereto but is to be construed broadly and restricted solely by the scope of the appended claims.

I claim:

1. A method of preparing the barium salt of pseudo acid of nitroaminoguanidine which comprises reacting a water solution of nitroaminoguanidine with barium hydroxide and recovering the barium salt of the pseudo acid of nitroaminoguanidine.

2. A method of preparing the barium salt of the pseudo acid of nitroaminoguanidine which comprises reacting 6 parts of a water solution of nitroaminoguanidine at 85° C. with a hot aqueous slurry containing 8 parts of barium hydroxide and recovering crystals of the barium salt of the pseudo acid of nitroaminoguanidine.

3. The barium salt of of the pseudo acid of nitroaminoguanidine having the following formula—

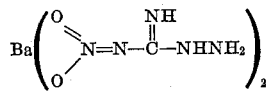

KENNETH D. ASHLEY.